United States Patent
Khaira et al.

(10) Patent No.: US 10,018,274 B2
(45) Date of Patent: Jul. 10, 2018

(54) DEVICE AND METHOD FOR MAGNETICALLY CONTROLLED DRY GAS SEAL

(71) Applicants: Niran Singh Khaira, Spring, TX (US); Richard A. Huntington, Spring, TX (US); Michael T. Matheidas, The Woodlands, TX (US)

(72) Inventors: Niran Singh Khaira, Spring, TX (US); Richard A. Huntington, Spring, TX (US); Michael T. Matheidas, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 27 days.

(21) Appl. No.: 15/229,712

(22) Filed: Aug. 5, 2016

(65) Prior Publication Data
US 2017/0045144 A1   Feb. 16, 2017

Related U.S. Application Data

(60) Provisional application No. 62/203,074, filed on Aug. 10, 2015.

(51) Int. Cl.
*F16J 15/34*   (2006.01)
*F16J 15/43*   (2006.01)

(52) U.S. Cl.
CPC ........... *F16J 15/43* (2013.01); *F16J 15/3444* (2013.01); *F16J 15/3492* (2013.01)

(58) Field of Classification Search
CPC ...... F16J 15/34; F16J 15/3404; F16J 15/3436; F16J 15/3444; F16J 15/3492
See application file for complete search history.

(56) References Cited

U.S. PATENT DOCUMENTS

| | | | | |
|---|---|---|---|---|
| 4,447,063 A | | 5/1984 | Kotzur et al. | 277/80 |
| 4,497,493 A | * | 2/1985 | Sall | F16J 15/3404 277/306 |
| 4,643,437 A | * | 2/1987 | Salant | F16J 15/3432 277/319 |
| 5,064,205 A | * | 11/1991 | Whitford | F16J 15/3436 277/317 |

(Continued)

FOREIGN PATENT DOCUMENTS

| | | | |
|---|---|---|---|
| DE | 3444175 | 3/1986 | F16J 15/034 |
| JP | S6337-000869 | 3/1988 | F16J 15/034 |
| JP | 04000073 | 1/1992 | F16J 15/034 |

*Primary Examiner* — Gilbert Y Lee
(74) *Attorney, Agent, or Firm* — ExxonMobil Upstream Research Company Law Department

(57) ABSTRACT

A method to control an axial separation between a rotating ring and a stationary ring of a dry gas seal. The dry gas seal restricts leakage of a gas or other fluid to or from a rotating device. At least one property of the gas or other fluid is sensed. At least one of the axial separation between the rotating ring and the stationary ring, and a time rate of change of the axial separation, is sensed. A stiffness of a film between the rotating ring and the stationary ring is estimated. A field strength of at least one magnetic device is adjusted based on at least two of the sensed axial separation, the sensed time rate of change of the separation, and the estimated film stiffness. The axial separation between the rotating ring and the stationary ring is adjusted.

18 Claims, 3 Drawing Sheets

(56) References Cited

U.S. PATENT DOCUMENTS

| | | | | |
|---|---|---|---|---|
| 5,696,412 | A | 12/1997 | Iannello | 310/90.5 |
| 5,736,800 | A | 4/1998 | Iannello et al. | 310/90.5 |
| 5,925,957 | A | 7/1999 | Chapman | 310/90.5 |
| 6,746,019 | B1 | 6/2004 | Liebenberg et al. | 277/410 |
| RE41,035 | E | 12/2009 | Ohtachi et al. | 310/90.5 |
| 8,584,514 | B2 | 11/2013 | Tecza et al. | 73/112.01 |
| 2007/0212238 | A1 | 9/2007 | Jacobsen et al. | 417/423.1 |
| 2008/0042364 | A1 | 2/2008 | Zheng et al. | 277/378 |
| 2009/0008881 | A1* | 1/2009 | Lee | F16J 15/445 |
| | | | | 277/412 |
| 2010/0072706 | A1 | 3/2010 | Schmitz et al. | 277/301 |
| 2014/0037422 | A1 | 2/2014 | Gilarranz et al. | 415/1 |

\* cited by examiner

DEVICE AND METHOD FOR MAGNETICALLY CONTROLLED DRY GAS SEAL

CROSS-REFERENCE TO RELATED APPLICATIONS

This patent application is related to U.S. Provisional Patent Application No. 62/203,074, titled "DEVICE AND METHOD FOR MAGNETICALLY CONTROLLED DRY GAS SEAL", and filed on Aug. 10, 2015, the disclosure of which is incorporated by reference herein in its entirety.

BACKGROUND

Field of Disclosure

The invention relates to rotating machinery, and more specifically, to reducing the occurrence of failure of dry gas seals.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as an admission of prior art.

The use of dry gas seals on compressors in the oil & gas industry is pervasive; yet despite decades of experience and technology advancements the failures of dry gas seals continue to consume time and money. Some failures can certainly be attributed to increasing pressure requirements, more difficult gas compositions, and functional requirements. The greatest proportion of those failures are caused by operational difficulties of the buffer gas supply system which contaminate buffer gas with liquid, water, solids, reverse pressurization, etc. These contaminants interrupt the film between the seal faces and cause the faces to contact, which can induce rapid heating due to friction and consequential material failure due to a duplicity of failure modes. Examples of operational causes include overloaded filters, condensation due to failure of buffer gas heaters, misoperation, failure to adjust system performance for changing gas conditions, etc.

One of the main causes of dry gas seal (DGS) failure is the loss of dynamic gas film between the rotating and stationary seal faces. This may occur because of liquid formation and/or ingress in the seal gas, or because of reverse pressurization of the seal gas. When DGS failure occurs, the seal faces come in contact at high machine rotating speed and the increase in temperature may cause the rotating ring to wear and/or fracture.

Having the ability to maintain a minimum clearance between the DGS stationary and rotating seal faces allows operation of seals during conditions where the dynamic gas film is lost while the machine is in operation. Without this clearance, the seal faces would come in contact and potentially fail the seal.

SUMMARY

In an aspect, a method to control an axial separation between a rotating ring and a stationary ring of a dry gas seal is disclosed. The dry gas seal restricts leakage of a gas or other fluid to or from a rotating device. At least one property of the gas or other fluid is sensed. At least one of the axial separation between the rotating ring and the stationary ring, and a time rate of change of the axial separation, is sensed. A stiffness of a film between the rotating ring and the stationary ring is estimated. A field strength of at least one magnetic device is adjusted based on at least two of the sensed axial separation, the sensed time rate of change of the separation, and the estimated film stiffness. The axial separation between the rotating ring and the stationary ring is adjusted.

In another aspect, a system that controls a dry gas seal disposed around a rotating shaft is disclosed. At least one is sensor disposed around a circumference of a shaft. The at least one sensor is configured to measure at least one property of a gas or other fluid. The at least one sensor is further configured to measure at least one of an axial separation between the rotating ring and the stationary ring, and a time rate of change of the axial separation. A controller is connected to the at least one sensor and is configured to receive signals from the at least one sensor. A power amplifier is connected to the controller. The power amplifier amplifies control signals generated by the controller. At least one electromagnet receives the amplified control signals from the power amplifier. The control signals are configured to adjust the at least one electromagnet to control the axial separation between the rotating ring and the stationary ring of the dry gas seal.

In another aspect, a method of controlling an axial separation between a rotating ring and a stationary ring of a dry gas seal is disclosed. The dry gas seal restricts leakage of a gas or other fluid to or from a rotating device. At least one sensing device is used to sense (i) the axial separation between the rotating ring and the stationary ring and (ii) a time rate of change of the axial separation. The sensed axial separation and the sensed time rate of change of the axial separation is used to adjust a field strength of at least one magnetic device. Adjusting the field strength of the at least one magnetic device adjusts the axial separation between the rotating ring and the stationary ring.

BRIEF DESCRIPTION OF THE DRAWINGS

These and other features, aspects and advantages of the disclosure will become apparent from the following description, appending claims and the accompanying drawings, which are briefly described below.

DETAILED DESCRIPTION

Figure 1:
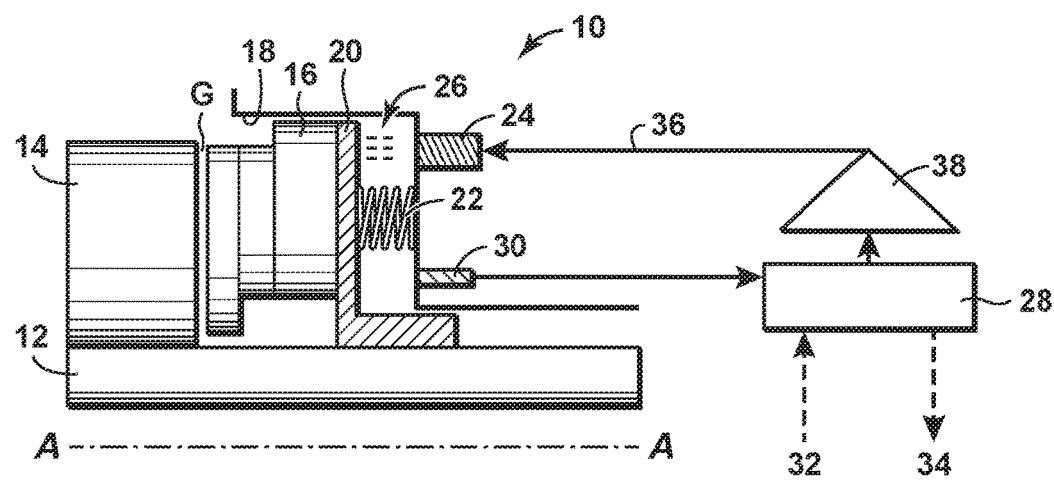
FIG. 1 is a schematic diagram of a dry gas seal system according to an aspect of the disclosure.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention. For purposes of clarity and brevity, similar reference numbers in the several Figures represent similar items, steps, or structures and may not be described in detail in every Figure.

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

In an aspect of the disclosure, magnets are used as a means to control dry gas seals. One or more sensors may be disposed around the circumference of a rotating shaft or other rotating machinery. A controller/computer may be connected to the sensors and provides signals representative of various sensed properties. One or more power amplifiers may be connected to outputs of the controller/computer. One or more electromagnets may be disposed around the circumference of the shaft for any dry gas seal configuration, to manipulate the dry gas seal ring. The electromagnets may be controlled by signals from the controller/computer as amplified by the one or more amplifiers and can be controlled thereby to adjust the clearance or gap between the stationary ring and the rotating ring of the dry gas seal. The device so described may be externally powered or use energy harvesting solutions, deriving or generating power. In this aspect, the spring used in conventional DGS primary ring retainer assemblies may be eliminated. The controller/computer may accept other inputs to influence the DGS ring. The controller/computer may output signals that may be beneficial for monitoring/control.

In another aspect where magnets may be used to control dry gas seals, one or more passive magnets may self-adjust the dry gas seal ring position for any dry gas seal configuration, to maintain a clearance between the stationary ring and the rotating ring of the dry gas seal assembly. This device so described may be used to eliminate the spring used in conventional DGS primary ring retainer assemblies.

In another aspect where magnets may be used as a means to control dry gas seals, one or more passive magnets are fixed, thereby keeping a minimum clearance between the stationary ring and the rotating ring of the dry gas seal rings, for any Dry Gas Seal configuration.

FIG. 1 is a schematic view of a dry gas seal (DGS) system 10 according to an aspect of the disclosure. A machinery element, such as a shaft 12, rotates around an axis of rotation collinear with or parallel to line A-A. The machinery element may be part of a turbine, pump, or the like. A rotating ring 14 is configured to rotate with the shaft 12. A primary ring 16 may be disposed within a recess 18 and may be configured to face the rotating ring 14 in a manner such that a gap G is maintained between the two rings. The primary ring may be mounted on a ring mount 20, which is made of or includes a ferromagnetic or other magnetically reactive material. The primary ring 16 and ring mount 20 are configured to not rotate around the axis of rotation, but may be movable in a direction substantially parallel to the axis of rotation so that the size of gap G may be modified according to principles disclosed herein.

The axial position of the primary ring 16 may be controlled by the combination of a spring 22 and one or more controllable magnets, represented in FIG. 1 by an electromagnet 24, which is disposed around the circumference of shaft 12. The spring 22, which is situated between recess 18 and ring mount 20, biases the primary ring 16 toward the rotating ring 14 to decrease gap G. The electromagnet 24 creates a magnetic field 26 that urges the magnetically reactive ring mount 20 and primary ring 16 in a direction away from rotating ring 14, to thereby increase gap G. The magnetic field may be varied using a controller 28 that responds to signals from one or more sensors, which are represented in FIG. 1 as a sensor 30. A temperature sensor is an example of a sensor that may be used individually or in combination with the described aspects. Other types of sensors may include those capable of sensing other properties of a gas or other fluid associated with the DGS system. Such properties may include pressure, composition, viscosity, density, fluid velocity, and fluid vaporization fraction. These sensed properties may be used to estimate the stiffness of a gas or fluid film (not shown) within Gap G. The size of gap G may be controlled based on the sensed temperature, the estimated film stiffness, and the amount of cooling required. Another type of sensor is a position, clearance, or gap sensor, which permits control of the size of gap G clearance based on the minimum amount of clearance required between rotating ring 14 and primary ring 16. Still another type of sensor is one that detects the time rate of change of position, clearance or gap. This type of sensor permits the addition of damping to the control of gap G as damping is a force related to the velocity or relative velocity of elements of the DGS system 10. One method of obtaining a measurement of a time rate of change may comprise taking the time derivative of the signal of the position, clearance or gap sensor. Another method may be to use a sensor that is directly sensitive to the velocity or relative velocity of the components of the DGS system 10. Still another method may be to integrate the signal of an acceleration sensitive sensor (e.g., an accelerometer) mounted on one or more components of the DGS system 10. Controller 28 may accept other inputs to influence the DGS system 10, and/or may output signals, such as a monitoring signal, that may be beneficial for monitoring/control. These inputs and outputs are represented in FIG. 1 at reference numbers 32 and 34, respectively.

Based on the signals received from the one or more sensors 30 (and optionally from input 32), controller 28 sends a control signal 36, amplified using a power amplifier 38, to vary the magnetic field 26 generated by electromagnet 24. When magnetic field 26 creates a force equal to the bias of spring 22, primary ring 16 does not move axially with respect to rotating ring 14. When magnetic field 26 creates a force less than or greater than the bias of spring 22, primary ring 16 axially moves toward or away from rotating ring 14. By controlling the relative positions of the primary ring relative to the rotating ring, the size of gap G may be controlled as desired.

Figure 2:
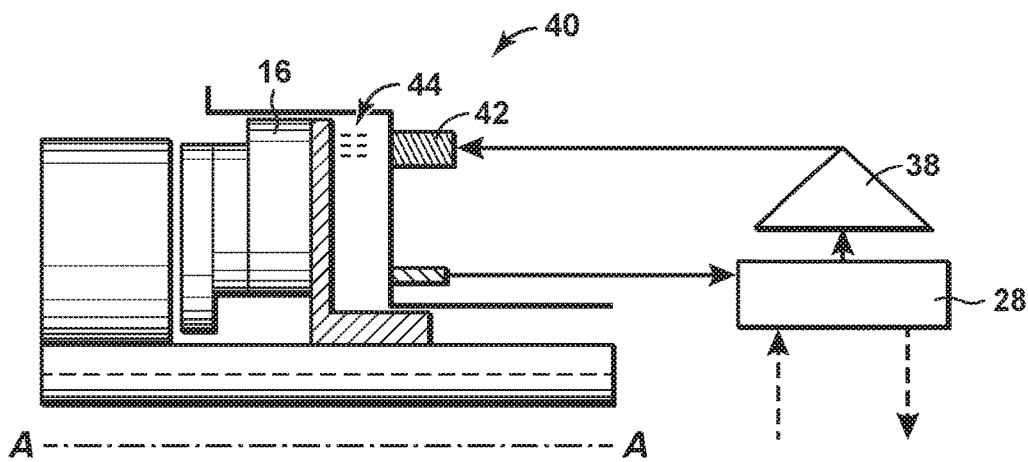
FIG. 2 is a schematic diagram of a dry gas seal system according to an aspect of the disclosure.

It is possible that electromagnet 24 may generate a reversible magnetic field 26 that is sufficiently strong to selectively move primary ring 16 both toward and away from rotating ring 14. In such a circumstance, the bias of spring 22 may not be necessary to move the primary ring toward the rotating ring, and the spring may therefore be eliminated from the DGS system 10. FIG. 2 is a schematic view of a DGS system 40 according to another aspect of the present disclosure that is substantially identical to aspects disclosed in FIG. 1, with like reference numbers indicating similar elements. DGS system 40 differs from DGS system 10 in that the spring 22 of DGS system 10 is eliminated. The electromagnet 42 may be configured to generate a reversible magnetic field 44 to effectuate bi-directional axial movement of the primary ring 16. Alternatively, the electromagnet may comprise one or more electromagnetic elements, where the polarity of some of the electromagnetic elements is opposite the polarity of others of the electromagnetic elements. Controller 28 activates selected ones of the electromagnetic elements depending on the direction the primary ring 16 is to move.

Some or all of the power required for powering the controller 28, power amplifier 38, the one or more sensors 30, and/or electromagnet 24 may be generated using an energy harvesting strategy or device. The energy harvesting may be accomplished by harnessing the rotating movement of the shaft 12 or other rotating machinery element, the axial movement of the rings or other axially moving parts, or a combination of rotating and axial movement of a part or parts of the machinery or DGS system. Furthermore, the energy harvesting may be accomplished using heat, pressure, flow, and/or electromagnetic flux variations of one or more parts of the machinery or DGS system.

Figure 3:
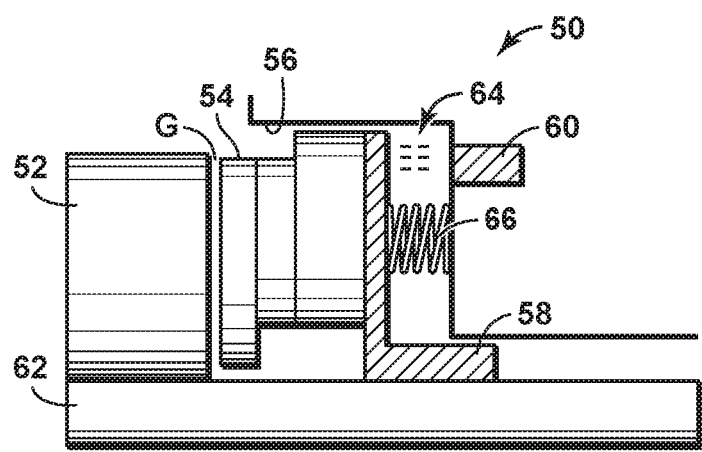
FIG. 3 is a schematic diagram of a dry gas seal system according to an aspect of the disclosure.

FIG. 3 is a schematic diagram of a DGS system 50 according to another aspect of the disclosure. DGS system 50 includes a rotating ring 52, a non-rotating primary ring 54, a recess 56, and a ring mount 58 as shown in the previous Figures. However, the magnetic force of DGS system 50 is not provided by one or more controllable electromagnets, but instead is provided by one or more passive magnets 60 arranged around the circumference of a shaft 62 or other rotating element. The passive magnets provide a constant magnetic field 64 to counteract the opposing bias of the spring 66. If the strength of passive magnets 60 is selected correctly, the interaction between the spring and the passive magnets provides a self-adjusting maintaining of the gap G between the rotating ring 52 and the primary ring 54. As the passive magnets are designed to not be controlled, the aspect shown in FIG. 3 contains no controllers, sensors, or power amplifiers.

Figure 4:
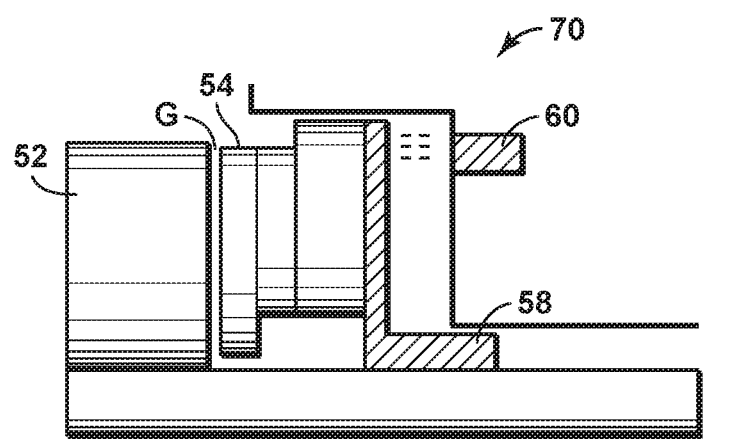
FIG. 4 is a schematic diagram of a dry gas seal system according to an aspect of the disclosure.

FIG. 4 is a schematic diagram of a DGS system 70 according to still another aspect of the disclosure similar to what is shown in FIG. 3. However, the spring 66 of FIG. 3 is eliminated in DGS system 70. The gap G is controlled solely by the passive magnets 60. The passive magnets may be oriented such that some of the magnets have reversed polarity. In this aspect, the magnetic field of some of the passive magnets move the ring mount 58 and primary ring 54 away from the rotating ring 52 in a direction substantially parallel to the line A-A, and the magnetic field of the remaining passive magnets prevent the ring mount 58 from getting too close to the passive magnets. Such an arrangement maintains the gap G as desired.

Using one or more magnets to control the gap or clearance between rings in a dry gas seal provides other opportunities for improvement in the design and operation of the dry gas seal. For example, the disclosed DGS system may be used to exercise/stroke/pulse the DGS in controlled situations, for example prior to machine startup. The disclosed DGS system may be used to keep the DGS open after the associated machinery has shut down and has been depressurized. The disclosed DGS system may be used to free DGS dynamic sealing element "hang-up" as required. The disclosed DGS system may be used to free DGS seal faces when seized together with contamination. The disclosed DGS system may be used to optimize parallelism of elements to compensate for design or assembly tolerance. Additionally, the disclosed DGS system may be used to keep seal elements from moving axially with every rotation if the rings, alone or together, are subjected to axial "swash"/misalignment (i.e. keeping faces of the rings perpendicular to the shaft). The disclosed DGS system may also be used to modify seal face gap clearances in a non-uniform manner to compensate for liquid pooling or other effects of contamination (i.e. seal faces are not parallel to each other). Also, the disclosed DGS system may be used to create oscillating variations in the gap and create a pumping action between the stationary and rotating rings.

Figure 5:
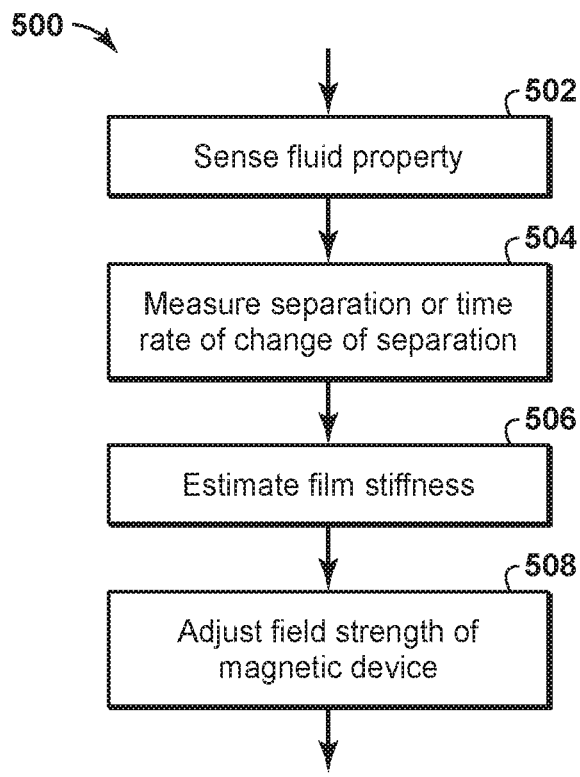
FIG. 5 is a flowchart showing a method according to disclosed aspects.

FIG. 5 is a flowchart 500 of a method to control an axial separation between a rotating ring and a stationary ring of a dry gas seal, wherein the dry gas seal restricts the leakage of a gas or other fluid to or from a rotating device, according to disclosed aspects. At block 502 at least one property of the gas or other fluid is sensed. At block 504 at least one of (i) the axial separation between the rotating ring and the stationary ring, and (ii) a time rate of change of the axial separation, is measured. At block 506 a stiffness of a film between the rotating ring and the stationary ring is estimated. The film comprises a gas or other fluid. At block 508 a field strength of at least one magnetic device is adjusted based on at least two of the sensed axial separation, the sensed time rate of change of the axial separation, and the estimated film stiffness. Adjusting the field strength of the at least one magnetic device adjusts and controls the axial separation between the rotating ring and the stationary ring.

Figure 6:
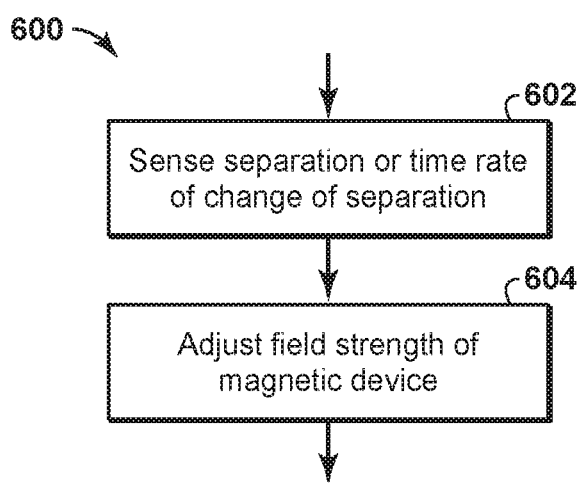
FIG. 6 is a flowchart showing a method according to disclosed aspects.

FIG. 6 is a flowchart 600 of a method of controlling an axial separation between a rotating ring and a stationary ring of a dry gas seal, wherein the dry gas seal restricts the leakage of a gas or other fluid to or from a rotating device, according to disclosed aspects. At block 602 at least one sensing device is used to sense (i) the axial separation between the rotating ring and the stationary ring, and (ii) a time rate of change of the axial separation. At block 604 a field strength of at least one magnetic device is adjusted using the sensed axial separation and the time rate of change of the axial separation. Adjusting the field strength of the at least one magnetic device adjusts and controls the axial separation between the rotating ring and the stationary ring.

The steps depicted in FIGS. 5 and 6 are provided for illustrative purposes only and a particular step may not be required to perform the disclosed methodology. Moreover, FIGS. 5 and 6 may not illustrate all the steps that may be performed. The claims, and only the claims, define the disclosed system and methodology.

Embodiments of the invention may include any combinations of the methods and systems shown in the following numbered paragraphs. This is not to be considered a complete listing of all possible embodiments, as any number of variations can be envisioned from the description above.

1. A method to control an axial separation between a rotating ring and a stationary ring of a dry gas seal, wherein the dry gas seal restricts leakage of a gas or other fluid to or from a rotating device, comprising:
  a) sensing at least one property of the gas or other fluid;
  b) sensing, with at least one sensing device, at least one of:
    i. the axial separation between the rotating ring and the stationary ring, and
    ii. a time rate of change of the axial separation;
  c) estimating a stiffness of a film between the rotating ring and the stationary ring, wherein the film comprises a gas or other fluid;
  d) adjusting a field strength of at least one magnetic device based on at least two of the sensed axial separation, the sensed time rate of change of the axial separation, and the estimated film stiffness, wherein adjusting the field strength of the at least one magnetic device adjusts the axial separation between the rotating ring and the stationary ring.

2. The method of paragraph 1, wherein the at least one property of the gas or other fluid is selected from pressure, temperature, composition, viscosity, density, velocity, dew point, and fraction vaporized.

3. The method of paragraph 1, wherein the temperature of the gas or other fluid is less than the dew point of the gas or fluid.

4. The method of paragraph 1 wherein the temperature of the gas or other fluid is greater than or equal to the dew point of the gas or fluid.

5. The method of any of paragraphs 1-4, wherein the at least one magnetic device is at least one electromagnet.

6. The method of paragraph 5, further comprising powering the at least one electromagnet from an external source.

7. The method of paragraph 5, further comprising powering the at least one electromagnet from an energy harvesting system that generates power.

8. The method of paragraph 1, wherein the at least one magnetic device is at least one passive magnetic device.

9. The method of any of paragraphs 1-8, wherein the at least one magnetic device comprises first, second, and third magnetic devices, and further comprising disposing the first, second, and third magnetic devices around a circumference of a rotating element of the rotating device.

10. The method of paragraph 9, wherein each of the first, second, and third magnetic devices are independently controllable electromagnetic devices, and further comprising independently adjusting at least one of the first, second, and third magnetic devices to control the axial separation between the rotating ring and the stationary ring at more than one angular position.

11. The method of any of paragraphs 1-10, wherein the at least one sensing device comprises first, second, and third sensing devices.

12. The method of any of paragraphs 1-11 wherein adjusting the field strength comprises adjusting the field strength in an oscillating fashion such that the axial separation between the rotating ring and the stationary ring is variable around the circumference of the sealing elements.

13. A system that controls a dry gas seal disposed around a rotating shaft, comprising:
  at least one sensor disposed around a circumference of a shaft, the at least one sensor configured to
    measure at least one property of a gas or other fluid, and/or
    measure at least one of;
      an axial separation between the rotating ring and the stationary ring, and
      time rate of change of the axial separation;
  a controller connected to the at least one sensor and configured to receive signals from the at least one sensor;
  a power amplifier connected to the controller that amplifies control signals generated by the controller;
  at least one electromagnet that receives the amplified control signals from the power amplifier, the control signals configured to adjust the at least one electromagnet to control the axial separation between the rotating ring and the stationary ring of the dry gas seal.

14. The system of paragraph 13, wherein the at least one sensor is one of a pressure sensor, a temperature sensor, a composition sensor, a viscosity sensor, a density sensor, a velocity sensor, a dew point sensor, and a gas vaporization fraction sensor.

15. The system of paragraph 13 or 14, wherein the at least one sensor is a position sensor that senses a clearance between the rotating ring and the stationary ring.

16. The system of any of paragraphs 13-15, further comprising an external power source that powers at least one of the controller, the at least one sensor, the power amplifier, and the electromagnet.

17. The system of any of paragraphs 13-16, further comprising one or more energy harvesting devices configured to generate power for at least one of the controller, the at least one sensor, the power amplifier, and the electromagnet.

18. The system of any of paragraphs 13-17, further comprising an output monitoring signal generated by the controller.

19. A method of controlling an axial separation between a rotating ring and a stationary ring of a dry gas seal, wherein the dry gas seal restricts leakage of a gas or other fluid to or from a rotating device, comprising:
  a) sensing, with at least one sensing device:
    i. the axial separation between the rotating ring and the stationary ring, and
    ii. a time rate of change of the axial separation;

b) using the sensed axial separation and the sensed time rate of change of the axial separation to adjust a field strength of at least one magnetic device, wherein adjusting the field strength of the at least one magnetic device adjusts the axial separation between the rotating ring and the stationary ring.

It should be understood that the numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A method to control an axial separation between a rotating ring and a stationary ring of a dry gas seal, wherein the dry gas seal restricts leakage of a gas or other fluid to or from a rotating device, comprising:
    a) sensing at least one property of the gas or other fluid;
    b) sensing, with at least one sensing device, at least one of
        i. the axial separation between the rotating ring and the stationary ring, and
        ii. a time rate of change of the axial separation;
    c) estimating a stiffness of a film between the rotating ring and the stationary ring, wherein the film comprises a gas or fluid;
    d) adjusting a field strength of at least one magnetic device based on at least two of the sensed axial separation, the sensed time rate of change of the separation, and the estimated film stiffness, wherein adjusting the field strength of the at least one magnetic device adjusts the axial separation between the rotating ring and the stationary ring.

2. The method of claim 1, wherein the at least one property of the gas or fluid is selected from pressure, temperature, composition, viscosity, density, velocity, dew point, and fraction vaporized.

3. The method of claim 1, wherein the temperature of the gas or fluid is less than the dew point of the gas or other fluid.

4. The method of claim 1 wherein the temperature of the gas or other fluid is greater than or equal to the dew point of the gas or other fluid.

5. The method of claim 1, wherein the at least one magnetic device is at least one electromagnet.

6. The method of claim 5, further comprising powering the at least one electromagnet from an external source.

7. The method of claim 5, further comprising powering the at least one electromagnet from an energy harvesting system that generates power.

8. The method of claim 1, wherein the at least one magnetic device is at least one passive magnetic device.

9. The method of claim 1, wherein the at least one magnetic device comprises first, second, and third magnetic devices, and further comprising disposing the first, second, and third magnetic devices around a circumference of a rotating element of the rotating device.

10. The method of claim 9, wherein each of the first, second, and third magnetic devices are independently controllable electromagnetic devices, and further comprising independently adjusting at least one of the first, second, and third magnetic devices to control the axial separation between the rotating ring and the stationary ring at more than one angular position.

11. The method of claim 1, wherein the at least one sensing device comprises first, second, and third sensing devices.

12. The method of claim 1, wherein adjusting the field strength comprises adjusting the field strength in an oscillating fashion such that the axial separation between the rotating ring and the stationary ring is variable around the circumference of the sealing elements.

13. A system that controls a dry gas seal disposed around a rotating shaft, comprising:
    at least one sensor disposed around a circumference of a shaft, the at least one sensor configured to
    measure at least one property of a gas or other fluid, and
    measure at least one of
        an axial separation between the rotating ring and the stationary ring, and
        a time rate of change of the axial separation;
    a controller connected to the at least one sensor and configured to receive signals from the at least one sensor;
    a power amplifier connected to the controller that amplifies control signals generated by the controller;
    at least one electromagnet that receives the amplified control signals from the power amplifier, the control signals configured to adjust the at least one electromagnet to control the axial separation between the rotating ring and the stationary ring of the dry gas seal.

14. The system of claim 13, wherein the at least one sensor is one of a pressure sensor, a temperature sensor, a composition sensor, a viscosity sensor, a density sensor, a velocity sensor, a dew point sensor, and a gas vaporization fraction sensor.

15. The system of claim 13, wherein the at least one sensor is a position sensor that senses a clearance between the rotating ring and the stationary ring.

16. The system of claim 13, further comprising an external power source that powers at least one of the controller, the at least one sensor, the power amplifier, and the electromagnet.

17. The system of claim 13, further comprising one or more energy harvesting devices configured to generate power for at least one of the controller, the at least one sensor, the power amplifier, and the electromagnet.

18. The system of claim 13, further comprising an output monitoring signal generated by the controller.

* * * * *